United States Patent
Hoffmann et al.

(10) Patent No.: US 12,027,282 B2
(45) Date of Patent: Jul. 2, 2024

(54) ARRANGEMENT FOR ATTACHING AN INSULATOR SLEEVE TO AN ELECTRICAL CONDUCTOR

(71) Applicant: TE Connectivity Germany GmbH, Bensheim (DE)

(72) Inventors: Bjoern Hoffmann, Bensheim (DE); Frank Kaehny, Bensheim (DE); Marcus Wolf, Bensheim (DE); Alexander Weber, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 766 days.

(21) Appl. No.: 17/101,726

(22) Filed: Nov. 23, 2020

(65) Prior Publication Data

US 2021/0166842 A1 Jun. 3, 2021

(30) Foreign Application Priority Data

Nov. 28, 2019 (DE) .............................. 202019106641

(51) Int. Cl.
| | |
|---|---|
| *H01R 4/2406* | (2018.01) |
| *H01B 13/00* | (2006.01) |
| *H01B 13/06* | (2006.01) |
| *H01B 13/22* | (2006.01) |
| *H01R 4/02* | (2006.01) |

(52) U.S. Cl.
CPC ....... *H01B 13/062* (2013.01); *H01B 13/0036* (2013.01); *H01B 13/22* (2013.01); *H01R 4/02* (2013.01); *H01R 4/2406* (2018.01)

(58) Field of Classification Search
CPC ........ H01R 11/281; H02G 15/10; H02G 3/04; H02G 3/0406; H02G 3/0418; H02G 3/0487

See application file for complete search history.

(56) References Cited

U.S. PATENT DOCUMENTS

| | | | |
|---|---|---|---|
| 7,012,194 B1 * | 3/2006 | Wang ................... | H01R 4/5066 174/92 |
| 10,218,111 B2 * | 2/2019 | Schüttler ................ | A61N 1/375 |
| 2018/0375227 A1 | 12/2018 | Kaehny et al. | |

FOREIGN PATENT DOCUMENTS

| | | |
|---|---|---|
| EP | 3419119 A1 | 12/2018 |
| WO | 2017032762 A1 | 3/2017 |

OTHER PUBLICATIONS

European Patent Office Communication, Application No. 20 210 148.1-1009, dated Feb. 3, 2023, 4 pages.
European Patent Office Communication, dated Apr. 28, 2021, 7 pages.

* cited by examiner

*Primary Examiner* — Tyrone V Hall, Jr.
(74) *Attorney, Agent, or Firm* — Barley Snyder

(57) ABSTRACT

An arrangement includes an insulator sleeve, a mounting sheath, an end piece of the insulator sleeve is received in a receptacle opening of the mounting sheath, and a holding pin penetrating the insulator sleeve and fixing the mounting sheath on the insulator sleeve in a non-displaceable manner in a length direction of the insulator sleeve.

18 Claims, 7 Drawing Sheets

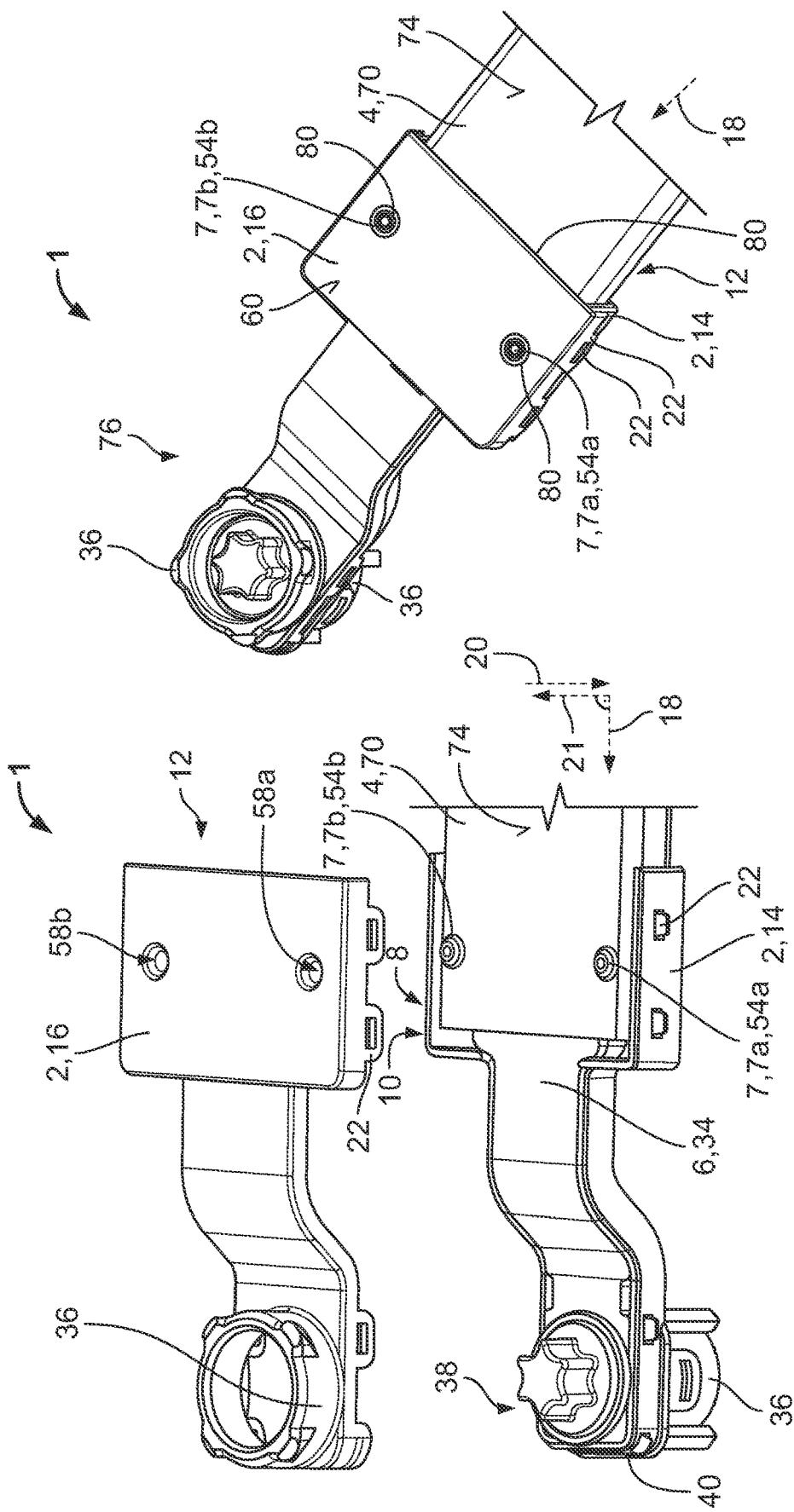

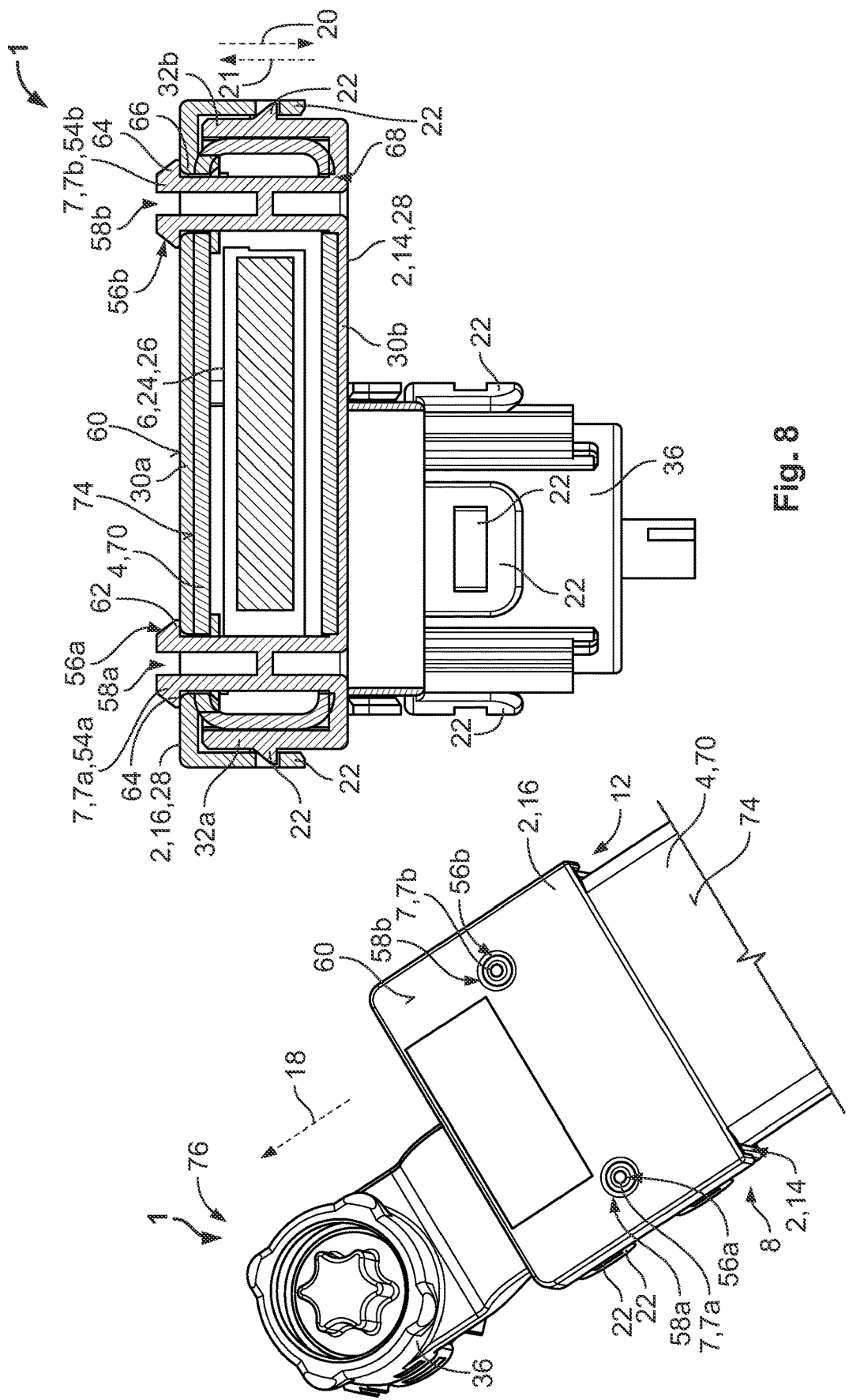

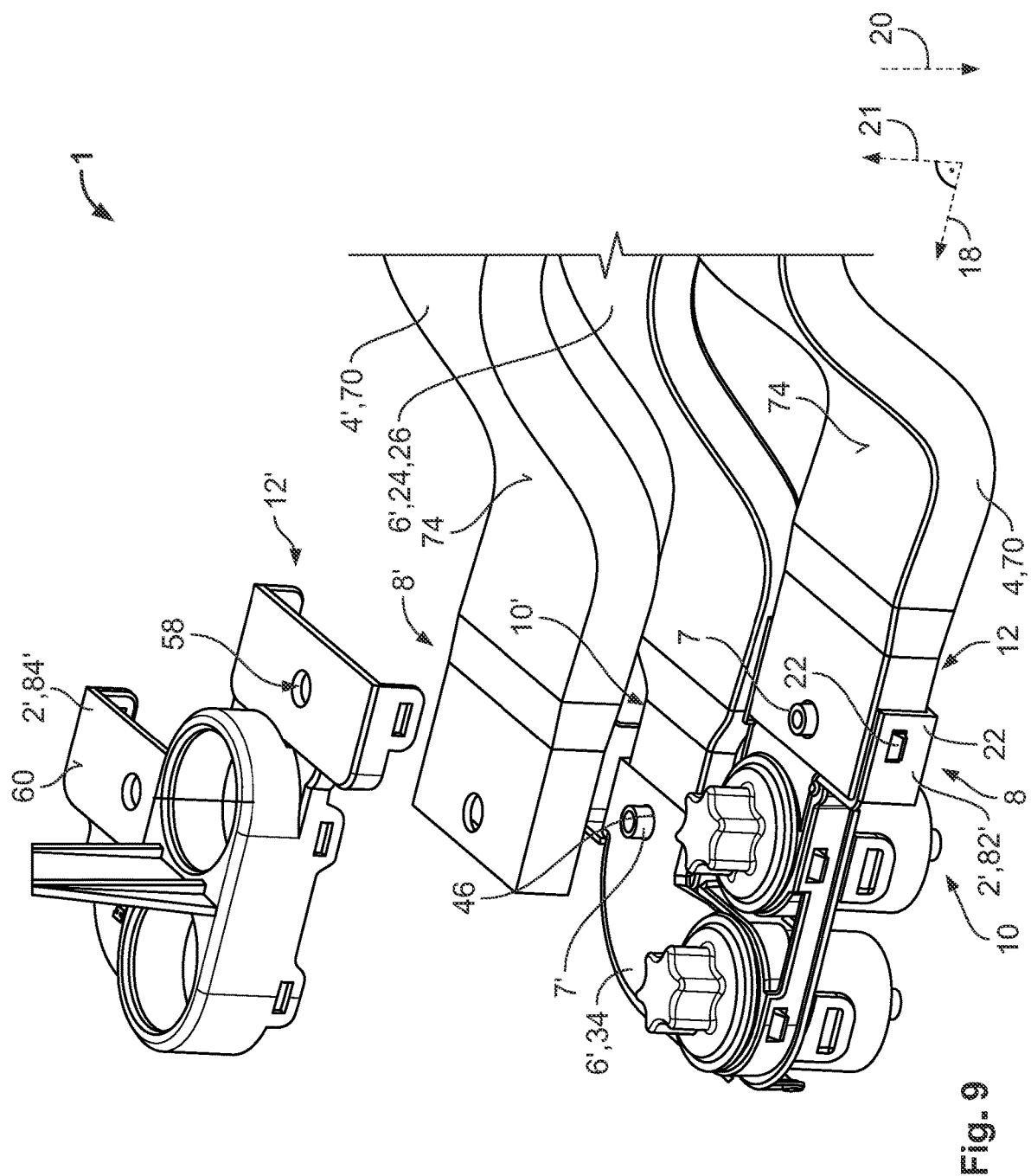

ARRANGEMENT FOR ATTACHING AN INSULATOR SLEEVE TO AN ELECTRICAL CONDUCTOR

CROSS-REFERENCE TO RELATED APPLICATION

This application claims the benefit of the filing date under 35 U.S.C. § 119(a)-(d) of German Patent Application No. 202019106641, filed on Nov. 28, 2019.

FIELD OF THE INVENTION

The present invention relates to an electrical conductor and, more particularly, to an electrical conductor with an attached insulator sleeve.

BACKGROUND

In automotive engineering and in power engineering, electrical modules, such as battery modules, are connected via particularly flexible electrical conductors to transmit electrical currents. For reasons of electrical safety, these electrical conductors are often provided with an insulation or insulator sleeve surrounding the electrical conductor. The insulation is usually also flexible and in certain applications also serves to protect the electrical conductor from external mechanical, thermal, and/or chemical effects.

A continuous adhesion between the inside of the insulator sleeve and the outside of the electrical conductor is a disadvantage if the electrical conductors have to be adapted to the spatial conditions of the electrical modules to be connected in the course of an assembly. For example, differences in height between individual connection points of the electrical modules are bridged by bending the electrical conductor together with the insulator sleeve. Particularly with narrow bending radii, material stresses can occur when the insulator sleeve and conductor adhere to each other, which can damage the conductor and/or insulator sleeve.

SUMMARY

An arrangement includes an insulator sleeve, a mounting sheath, an end piece of the insulator sleeve is received in a receptacle opening of the mounting sheath, and a holding pin penetrating the insulator sleeve and fixing the mounting sheath on the insulator sleeve in a non-displaceable manner in a length direction of the insulator sleeve.

BRIEF DESCRIPTION OF THE DRAWINGS

The invention will now be described by way of example with reference to the accompanying Figures, of which:

FIG. 1 is an exploded perspective view of an arrangement according to an embodiment;

FIG. 2 is a perspective view of the arrangement of FIG. 1;

FIG. 7 is a perspective view of the insulator sleeve, electrical conductor, and first shell of FIG. 6 with a second shell according to an embodiment;

FIG. 8 is a sectional side view of an arrangement according to another embodiment;

FIG. 9 is an exploded perspective view of an arrangement according to another embodiment.

DETAILED DESCRIPTION OF THE EMBODIMENT(S)

Figure 3:
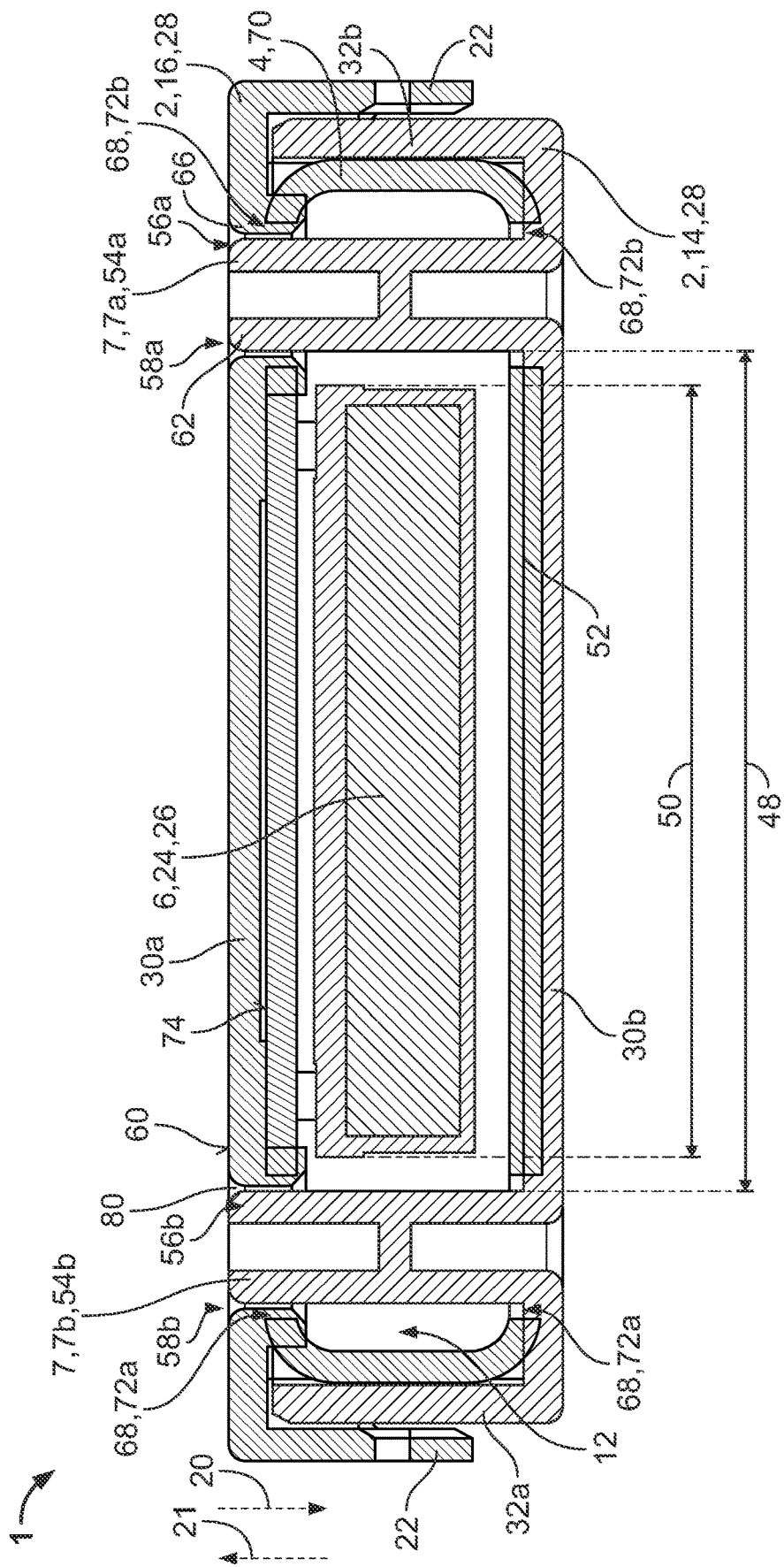
FIG. 3 is a sectional side view of the arrangement of FIG. 1.

Features and exemplary embodiments as well as advantages of the present disclosure will be explained in detail with respect to the drawings. It is understood that the present disclosure should not be construed as being limited by the description of the following embodiments. It should furthermore be understood that some or all of the features described in the following may also be combined in alternative ways.

First, the schematic structure of an arrangement 1 according to the invention is shown according to a first possible embodiment with reference to FIGS. 1 to 8. Subsequently, the schematic structure of an arrangement 1 in accordance with the invention is described according to a further possible embodiment with reference to FIGS. 9 and 10.

The arrangement 1 in accordance with the invention may comprise a mounting sheath 2 and an insulator sleeve 4 in a first possible embodiment. The insulator sleeve 4 can accommodate or surround an electrical conductor 6. The arrangement 1 can also comprise the electrical conductor 6. Optionally, the insulator sleeve 4 can surround the electrical conductor 6 along the entire length of the electrical conductor 6.

As shown in FIG. 1, the arrangement 1 can be used to attach the insulator sleeve 4 to the electrical conductor 6 by the mounting sheath 2. In particular, an end piece 8 of the insulator sleeve 4 and/or an end piece 10 of the electrical conductor 6 can be accommodated in a receptacle opening 12 of the mounting sheath 2 and fixed in a non-displaceable manner in a length direction 18 of the insulator sleeve 4.

In the embodiment shown in FIG. 1, the mounting sheath 2 is configured in two parts. For this, the mounting sheath 2 can consist of a first shell 14 and a second shell 16 which can be plugged together with the first shell 14 in a plug-in direction 20 perpendicular to the length direction 18. The shells 14, 16 can be adapted to be latched with each other and, when assembled, can create the receptacle opening 12 together. In particular, there may be at least one latching device 22 for latching the two shells 14, 16 outside the receptacle opening 12 of the mounting sheath 2 and outside the insulator sleeve 4. Alternatively, the first shell 14 and the second shell 16 can be connected to each other via a connection comprising a screw connection, adhesive connection, welded connection and/or soldered connection.

The two-part embodiment allows, in a first assembly step, to provide the insulator sleeve 4 and/or the electrical conductor 6 along the plug-in direction 18 in the first shell 14 and subsequently, in a second assembly step, to push the second shell 16 onto the first shell 14 in the plug-in direction 20. Thus, the assembly steps can be carried out automatically, for example in a pick-and-place process.

Figure 5:
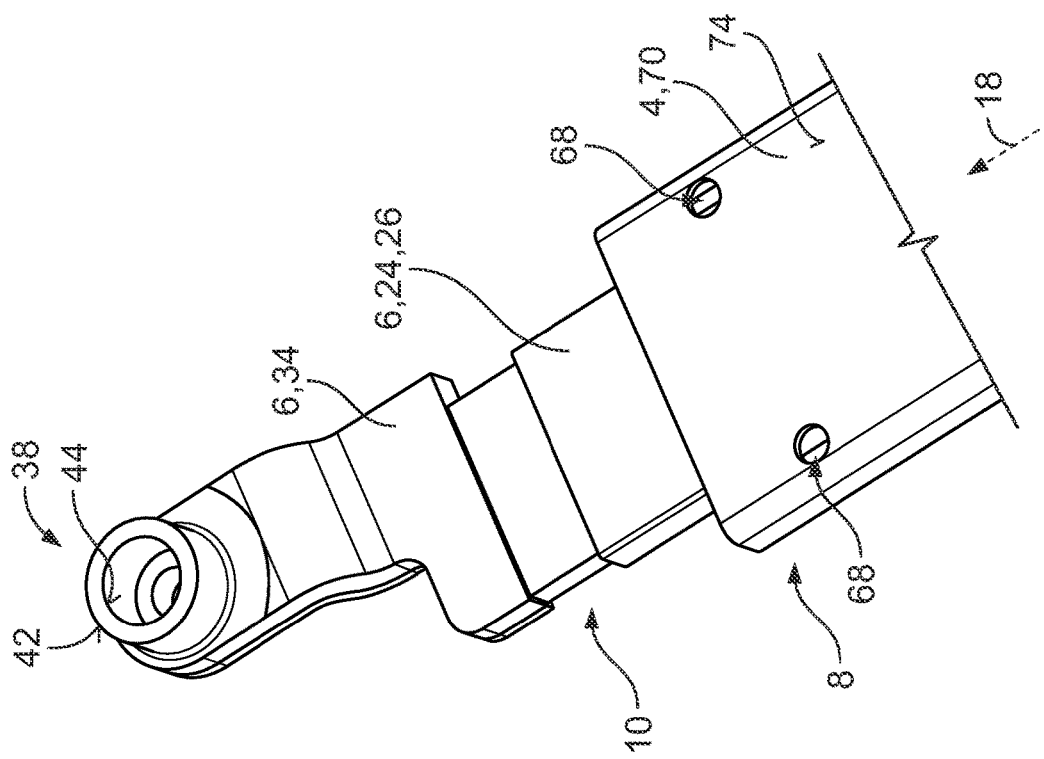
FIG. 5 is a perspective view of an insulator sleeve according to an embodiment and an electrical conductor with a contact element.

In the exemplary representations shown in FIGS. 1 and 5, the electrical conductor 6 is configured as a flexible flat conductor 24 of a cell connector 26 for battery modules. However, the electrical conductor 6 can have any desired geometry, which is predetermined in an embodiment and to which the shape of the insulator sleeve 4 and the shape of the receptacle opening 12 are adapted. Thus, the receptacle opening 12 of the mounting sheath 2 can extend straight in the length direction 18 and have a rectangular cross-section in a plane perpendicular to the length direction 18. Alternatively, the receptacle opening 12 of the mounting sheath 2 can have a square, polygonal, round or oval cross-section in the plane perpendicular to the length direction 18 and be configured for correspondingly shaped insulator sleeves 4 and electrical conductors 6.

The insulator sleeve 4 is configured for electrical conductors 6 of a predetermined size or cross-sectional geometry. Electrical conductors 6 of a different size or cross-sectional geometry should not be used with such an insulator sleeve 4 in this configuration.

Figure 4:
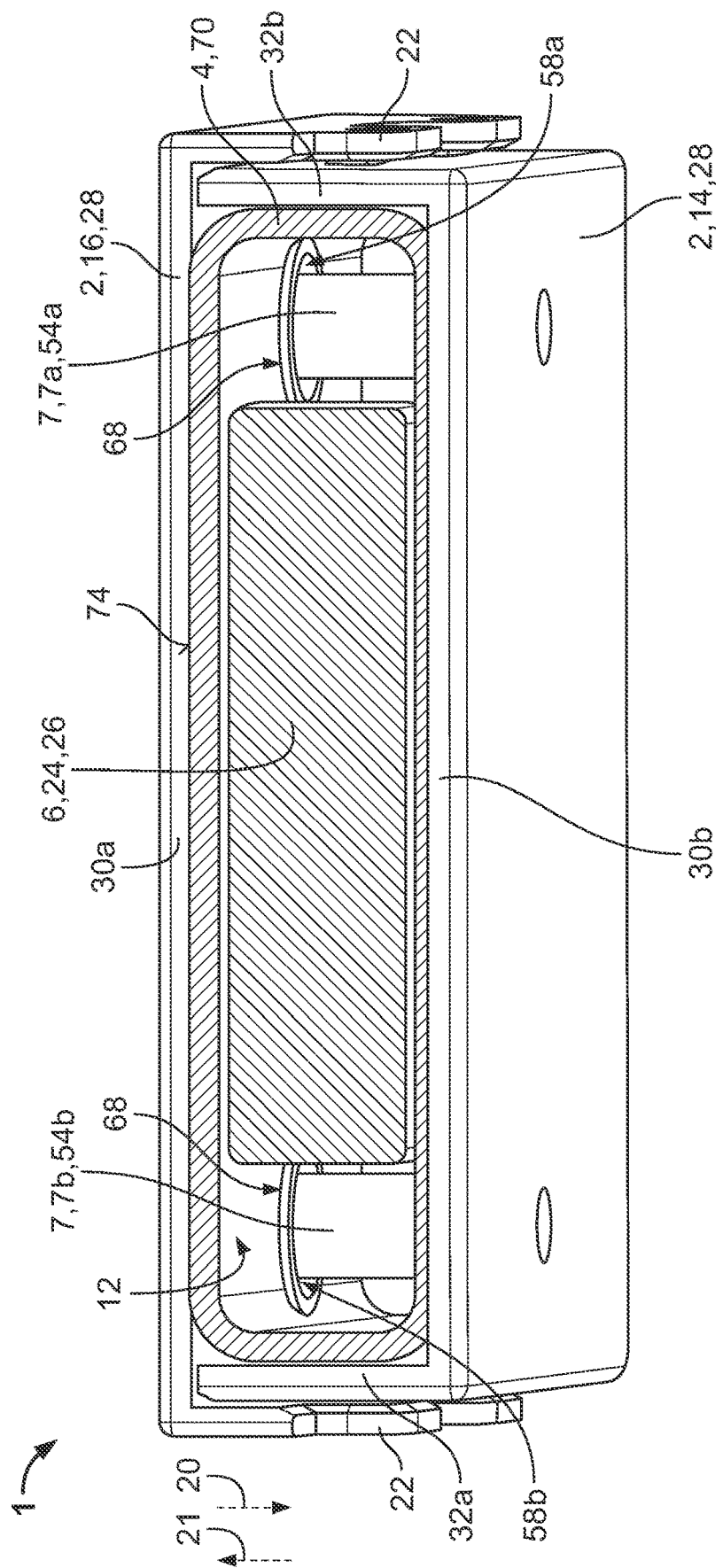
FIG. 4 is another sectional side view of the arrangement of FIG. 1.
Figure 6:
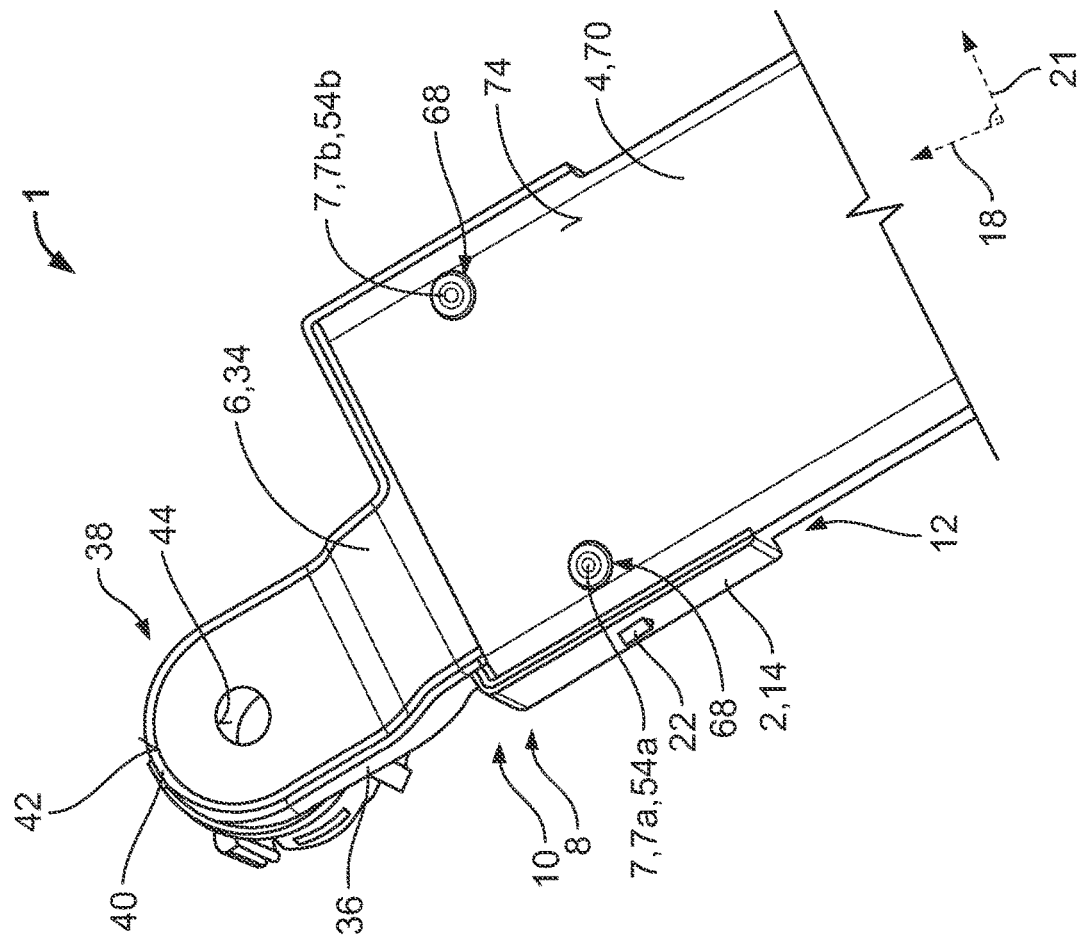
FIG. 6 is a perspective view of the insulator sleeve and electrical conductor of FIG. 5 in a first shell according to an embodiment.

As shown in the sectional drawings in FIG. 3 and FIG. 4, the mounting sheath 2 for creating the rectangular cross-section can consist of a cuboidal casing 28 whose two flat sides 30a, 30b and two long sides 32a, 32b connecting the flat sides 30a, 30b surround the receptacle opening 12. The resulting inner circumference of the receptacle opening 12 can be configured in such a way that the insulator sleeve 4 surrounding the electrical conductor 6 can be enclosed with a perfect fit. This embodiment is advantageous for applications in which flat conductors 6 are used and is particularly suitable for use in cell connectors for battery modules.

As shown in FIG. 5, the electrical conductor 6 may have a contact element 34 at the end piece 10 received in the receptacle opening 12. The contact element 34 can be welded, soldered or screwed on, for example, and can be accommodated in a housing section 36 of the mounting sheath 2, shown in FIGS. 1 and 2. In particular, the housing section 36 can surround a distal end 38 of the contact element 34 facing away from the electrical conductor 6 and create a longitudinal fixation 40 shown in FIG. 6. For this, the housing section 36 can extend in the length direction 18 beyond the distal end 38 and rest on at least one surface 42 of the contact element 34 facing in the length direction 18 and on at least one surface 44 facing against the length direction 18. This results in a positive-locking, potentially releasable connection between the electrical conductor 6 and the mounting sheath 2.

As shown in FIGS. 1 and 2, at least one holding pin 7 is provided in the receptacle opening 12, which penetrates the insulator sleeve 4 and thus fixes the mounting sheath 2 in length direction 18 on the insulator sleeve 4 in a non-displaceable manner. Depending on the application, one holding pin 7 may be sufficient as long as the at least one holding pin 7 creates a positive-locking, optionally releasable connection between the insulator sleeve 4 and the mounting sheath 2, and thus a non-adhering insulator sleeve 4 can be easily attached to the electrical conductor 6.

As an alternative to or in addition to the longitudinal fixation 40 already explained, the at least one holding pin 7 can also penetrate the electrical conductor 6 to create a positive-locking, optionally releasable connection between the electrical conductor 6 and the mounting sheath 2. For this, the electrical conductor 6 can have at least one recess 46, which is complementary to the at least one holding pin 7 and into which the at least one holding pin 7 protrudes at least partially. This is shown as an example in FIGS. 9 and 10.

In this way, the insulator sleeve 4 can be fixed to the electrical conductor 6 by the mounting sheath 2 and at the same time, locally limited relative movement between insulator sleeve 4 and electrical conductor 6, e.g. within the scope of mechanical stress equalization movements, can be carried out unhindered.

In an embodiment, the insulator sleeve 4 is made as a soft component, such as a silicone insulating tube, and the mounting sheath 2 is made of a material that has a yield limit under mechanical stress that is higher than the tensile strength of the soft component. Thus, the load capacity of the positive-locking connection between the insulator sleeve 4 and the mounting sheath 2 is clearly defined, since the material of the insulator sleeve 4 tears before the at least one holding pin 7 of the mounting sheath 2 would deform significantly.

The at least one holding pin 7 is located at a place where the electrical conductor 6 of predetermined size or cross-sectional geometry is located in the insulator sleeve 4. Alternatively, the electrical conductor 6 can also be attached displaceably in the insulator sleeve 4 without being penetrated by the holding pins 7.

In the exemplary embodiment shown in FIGS. 1 to 3, in particular two parallel holding pins 7a, 7b are arranged at a distance from one another perpendicular to the length direction 18, the distance 48 between the two holding pins 7a, 7b being greater than a width 50 of the electrical conductor 6, so that the electrical conductor 6 can pass between the two holding pins 7a, 7b without being penetrated by the two holding pins 7a, 7b. This is shown in the sectional drawing in FIG. 3. If required, the positive-locking, releasable, connection between the electrical conductor 6 and the mounting sheath 2 can be created in this embodiment by other means, as explained below.

As further illustrated in FIG. 3, the at least one holding pin 7 can project as a part of the mounting sheath 2 from a surface 52 of the mounting sheath 2 facing inwardly towards the receptacle opening 12 and protrude into the receptacle opening 12. In the exemplary embodiments shown, the holding pins 7a, 7b are configured as straight, cylindrical projections 54a, 54b which project from the first shell 14 into the receptacle opening 12, whereby a pin end 56a, 56b of the respective holding pin 7a, 7b facing away from the first shell 14 penetrates a corresponding inspection opening 58a, 58b in the second shell 16.

In an embodiment, the respective pin end 56a, 56b is visible on an outer surface 60 of the mounting sheath 2 in an assembled state of the shells 14, 16. This provides the possibility to carry out a visual inspection during and/or after assembly to check whether the insulator sleeve 4 has been positioned properly during assembly. In case of a wrong positioning, the at least one holding pin 7 cannot penetrate the through openings 68 in the insulator sleeve 4, so that the pin end 56 of the at least one holding pin 7 is covered by the insulator sleeve 4 and is not visible.

Holding pins 7 and inspection openings 58 can also be provided alternately on the first shell 14 and on the second shell 16. Furthermore, the holding pins 7 may differ from each other in their shape and, together with the associated inspection openings 58, create a geometric coding which additionally prevents the shells 14, 16 from being positioned incorrectly. For example, a set of a first shell 14 and an associated second shell 16 may have a plurality of holding pins 7 and inspection opening 58 that differ in number, position and shape from another set of associated shells. In this way, a key-lock principle can be realized, which prevents that shells 14, 16 that do not belong together are plugged together and installed.

The at least one holding pin 7 that are part of the first shell 14 function as a positioning aid in so far as the at least one holding pin 7 determines the position in which the at least one through opening 68 of the insulator sleeve 4 is to be placed.

If multiple holding pins 7a, 7b are provided on the first shell 14, they may differ from each other in their shape in order to create a geometric coding which additionally prevents the insulator sleeve 4 from being positioned incorrectly.

In another embodiment, the at least one holding pin 7 can be a separate component penetrating the mounting sheath 2 and/or the insulator sleeve 4. The at least one holding pin 7 can, for example, be configured as a screw, such as a hand screw, which is screwed into a threaded bore of the mounting sheath 2, the first shell 14 and/or the second shell 16 and thereby penetrates the at least one through opening 68 of the insulator sleeve 4.

In addition or as an alternative to the at least one latching device 22, at least one latching element 64 may be located on an outer edge 62 of the pin end 56 of the at least one holding pin 7, which may latch with an inner edge 66 of the inspection opening 58, as shown in FIG. 8.

In an alternative embodiment, the at least one holding pin 7 can also be configured as a dome-shaped, mandrel-shaped, cuboid or prism-shaped projection. If multiple holding pins 7 are provided, the holding pins 7 can differ among themselves in their shape and thus generate a geometrical coding. In addition, a set of a first shell 14 and an associated second shell 16 can, for example, have a plurality of holding pins 7 and inspection openings 58, which differ in number, position and shape from another set of associated shells according to a key-lock principle.

As shown in FIG. 5, the insulator sleeve 4 may have at least one through opening 68 extending perpendicular to the length direction 18 for inserting or passing through the at least one holding pin 7. In an embodiment, the inner diameter and/or the inner contour of the at least one through opening 68 corresponds to the outer diameter and/or the outer contour of the at least one holding pin 7.

In the exemplary embodiment shown, the insulator sleeve 4 is configured as a tubular insulating jacket 70 and has two pairs 72a, 72b of aligned through openings 68 at the end piece 8 received in the receptacle opening 12, the through openings 68 of the respective pair 72a, 72b being arranged opposite one another on an outer surface 74 of the insulating jacket 70 with respect to the length direction 18, as shown in FIG. 3. The insulator sleeve 4 can of course have a plurality of through openings 68, which are arranged in pairs in an overlapping arrangement in an insertion direction 21 perpendicular to the length direction 18 of the insulator sleeve 4. Accordingly, a holding pin 7 can be provided for each pair of through openings 68. The at least one through opening 68 allows a clearly definable and repeatable positioning of the insulator sleeve 4 in relation to the mounting sheath 2. This simplifies the assembly of the insulator sleeve 4 with the mounting sheath 2.

As shown in FIG. 7, the insulator sleeve 4 together with the mounting sheath 2 can form for the electrical conductor 6 and the contact element 34 a contact protection 76, especially a protection against the insertion of a wire with a diameter greater than X mm. In other embodiments, the protection can be against contact according to IPXXD or other corresponding standards. For this, the outer surfaces 60, 74 of the insulator sleeve 4 and the mounting sheath 2 can be configured in such a way that all gaps 80 present, for example the distance between the inner edge 66 of the inspection opening 58 and the outer edge 62 of the pin end 56 of the at least one holding pin 7, are smaller than X mm, where X corresponds to a normatively required value.

Figure 10:
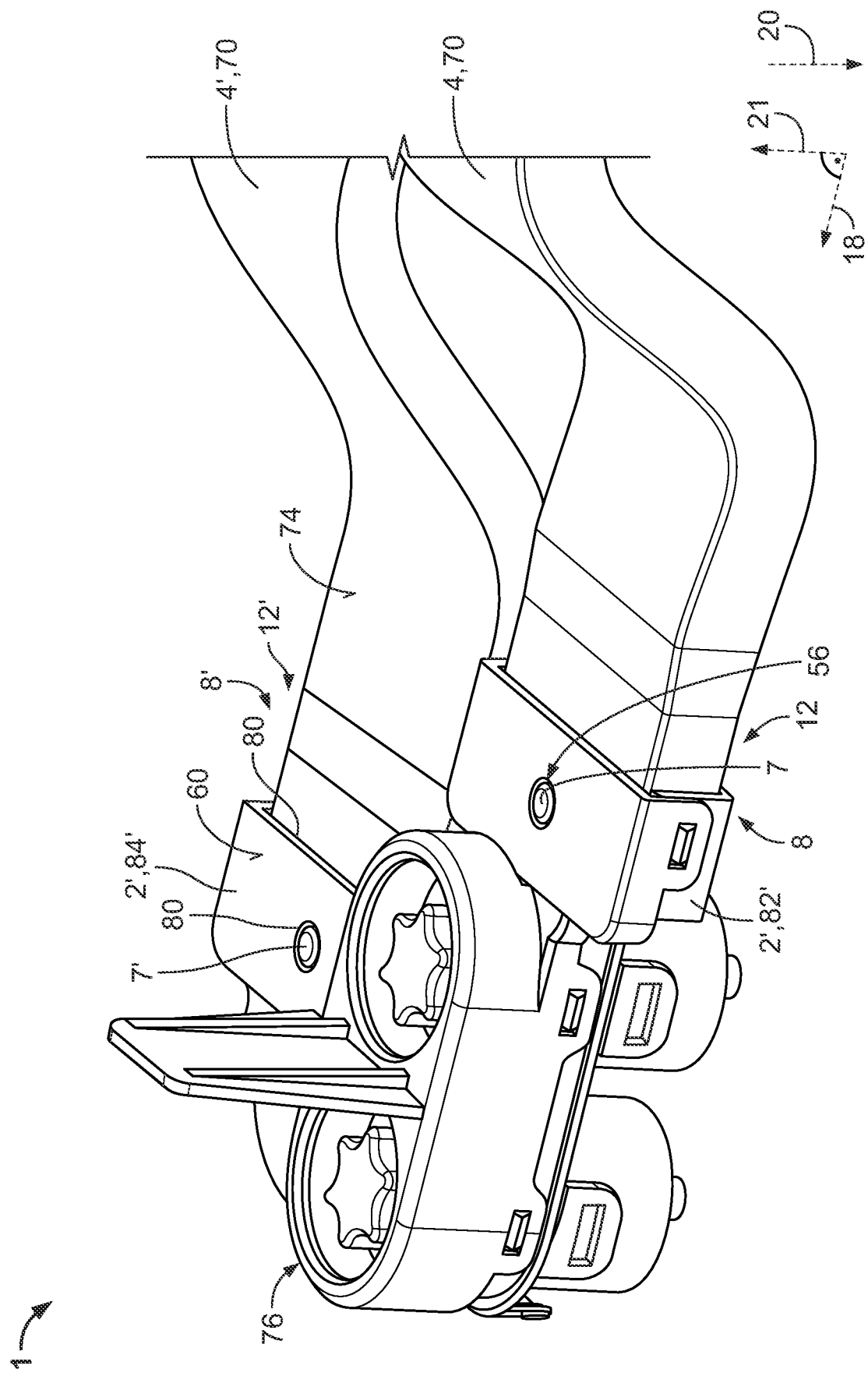
FIG. 10 is a perspective view of the arrangement of FIG. 9.

FIGS. 9 and 10 show a further embodiment of the arrangement 1 according to the invention, which has at least one further insulator sleeve 4' and a further mounting sheath 2' for attaching the at least one further insulator sleeve 4' to at least one further electrical conductor 6'. In particular, the at least one further mounting sheath 2' can have a receptacle opening 12' with at least one holding pin 7' for the positive-locking reception of an end piece 8' of the at least one further insulator sleeve 4' and/or an end piece 10' of the at least one further electrical conductor 6'.

In an embodiment, the mounting sheaths 2, 2' can be monolithically connected to each other in this embodiment to reduce the number of individual components required. The respective mounting sheaths 2, 2' can be configured according to the embodiments already explained.

As further shown in FIGS. 9 and 10, the mounting sheath 2, 2' can consist of a first multiple shell 82' forming the mounting sheath 2, 2' and a second multiple shell 84' forming the mounting sheath 2, 2'. In an embodiment, the first multiple shell 82' can be latched together with the second multiple shell 84' in plug-in direction 20. Optionally, the multiple shells 82', 84' can be configured in such a way that the receptacle openings 12, 12' are arranged coplanar.

This embodiment allows, in a first assembly step, to place all insulator sleeves 4, 4' and/or all electrical conductors 6, 6' along the plug-in direction 20 in the first multiple shell 82' and subsequently, in a second assembly step, to plug the second multiple shell 84' onto the first multiple shell 82' in the plug-in direction 20. Thus, these assembly steps can also be carried out automatically, for example in a pick-and-place process.

What is claimed is:

1. An arrangement, comprising:
   an insulator sleeve;
   a mounting sheath, an end piece of the insulator sleeve is received in a receptacle opening of the mounting sheath; and
   a holding pin penetrating the insulator sleeve and fixing the mounting sheath on the insulator sleeve in a non-displaceable manner in a length direction of the insulator sleeve, the holding pin is formed with and part of the mounting sheath.

2. The arrangement of claim 1, wherein the insulator sleeve has a through opening receiving the holding pin.

3. The arrangement of claim 1, wherein the mounting sheath consists of two parts.

4. The arrangement of claim 1 wherein the holding pin is part of a first shell forming the mounting sheath and a pin end of the holding pin facing away from the first shell penetrates a second shell forming the mounting sheath.

5. The arrangement of claim 4, wherein the mounting sheath has a latching device outside the receptacle opening latching the first shell to the second shell.

6. The arrangement of claim 1, wherein the receptacle opening has a rectangular cross-section.

7. The arrangement of claim 1, wherein the mounting sheath has a housing section for a contact element of an electrical conductor.

8. The arrangement of claim 1, further comprising an electrical conductor.

9. The arrangement of claim 8, wherein the insulator sleeve surrounds the electrical conductor.

10. The arrangement of claim 9, wherein a positive-locking connection between the electrical conductor and the mounting sheath acts in a length direction of the electrical conductor.

11. The arrangement of claim 10, wherein the electrical conductor has a contact element, the positive-locking connection occurs between the mounting sheath and the contact element.

12. The arrangement of claim 9, wherein the insulator sleeve forms a contact protection for the electrical conductor with the mounting sheath.

13. The arrangement of claim 9, wherein the electrical conductor is penetrated by the holding pin.

14. The arrangement of claim 9, wherein at least two holding pins are provided in the receptacle opening.

15. The arrangement of claim 14, wherein the electrical conductor has a predetermined cross-sectional geometry and is accommodated between the at least two holding pins in the receptacle opening.

16. The arrangement of claim 1, further comprising a further insulator sleeve and a further mounting sheath attaching the further insulator sleeve to a further electrical conductor.

17. The arrangement of claim 16, wherein the mounting sheath and the further mounting sheath are monolithically connected to one another.

18. The arrangement of claim 16, wherein the mounting sheath and the further mounting sheath are formed by a first multiple shell and a second multiple shell.

\* \* \* \* \*